US010228816B2

(12) United States Patent
Paz et al.

(10) Patent No.: US 10,228,816 B2
(45) Date of Patent: Mar. 12, 2019

(54) ONLINE STORE

(71) Applicant: Powerfront Inc, Beverly Hills, CA (US)

(72) Inventors: Hadar Paz, Beverly Hills, CA (US); Michael Browitt, Bentleigh (AU); Gregory John Platt, Richmond (AU)

(73) Assignee: Powerfront, Inc

( * ) Notice: Subject to any disclaimer, the term of this patent is extended or adjusted under 35 U.S.C. 154(b) by 784 days.

(21) Appl. No.: 13/843,327

(22) Filed: Mar. 15, 2013

(65) Prior Publication Data

US 2014/0019916 A1 Jan. 16, 2014

Related U.S. Application Data

(60) Provisional application No. 61/670,039, filed on Jul. 10, 2012.

(51) Int. Cl.
| | |
|---|---|
| G06F 3/0481 | (2013.01) |
| G06F 3/0484 | (2013.01) |
| G06Q 30/02 | (2012.01) |
| G06Q 30/06 | (2012.01) |

(52) U.S. Cl.
CPC ...... G06F 3/04815 (2013.01); G06F 3/04842 (2013.01); G06Q 30/02 (2013.01); G06Q 30/0601 (2013.01)

(58) Field of Classification Search
CPC ... G06F 3/04815; G06F 3/04842; G06F 3/048
USPC .......................................................... 715/848
See application file for complete search history.

(56) References Cited

U.S. PATENT DOCUMENTS

| | | | | |
|---|---|---|---|---|
| 6,976,056 | B1* | 12/2005 | Kumar | G06Q 10/10 705/26.25 |
| 8,560,955 | B2* | 10/2013 | Jana | G06Q 30/02 715/757 |
| 2001/0034661 | A1* | 10/2001 | Ferreira | G06F 3/04815 705/14.4 |
| 2002/0113809 | A1* | 8/2002 | Akazawa | G06F 3/04815 715/706 |
| 2002/0154162 | A1* | 10/2002 | Bhatia | G06Q 30/06 715/745 |
| 2007/0226082 | A1* | 9/2007 | Leal | G06Q 30/02 705/14.71 |
| 2009/0138375 | A1* | 5/2009 | Schwartz | G06Q 30/0601 705/26.1 |
| 2009/0138807 | A1* | 5/2009 | Fuhrmann | A63F 13/12 715/757 |
| 2009/0241037 | A1* | 9/2009 | Hyndman | H04L 65/4015 715/757 |

(Continued)

*Primary Examiner* — Stella Higgs

(57) ABSTRACT

A method and system are presently disclosed. The method discloses providing tracking program code to a visitor console, process action data from the visitor console, wherein the tracking program generates the action data based on a webpage of a website displayed on the visitor console, display a three dimensional graphical representation of the website to a user console, display at least one computer generated character interacting with the three dimensional graphical representation of the website, wherein the at least one computer generated character interacts with the three dimensional graphical representation of the website based on the action data.

15 Claims, 19 Drawing Sheets

(56) References Cited

U.S. PATENT DOCUMENTS

| | | | |
|---|---|---|---|
| 2010/0121810 A1* | 5/2010 | Bromenshenkel | G06F 3/04815 706/54 |
| 2010/0122182 A1* | 5/2010 | Bromenshenkel | G06F 3/011 715/745 |
| 2010/0161540 A1* | 6/2010 | Anisimov | G06Q 30/02 706/47 |

* cited by examiner

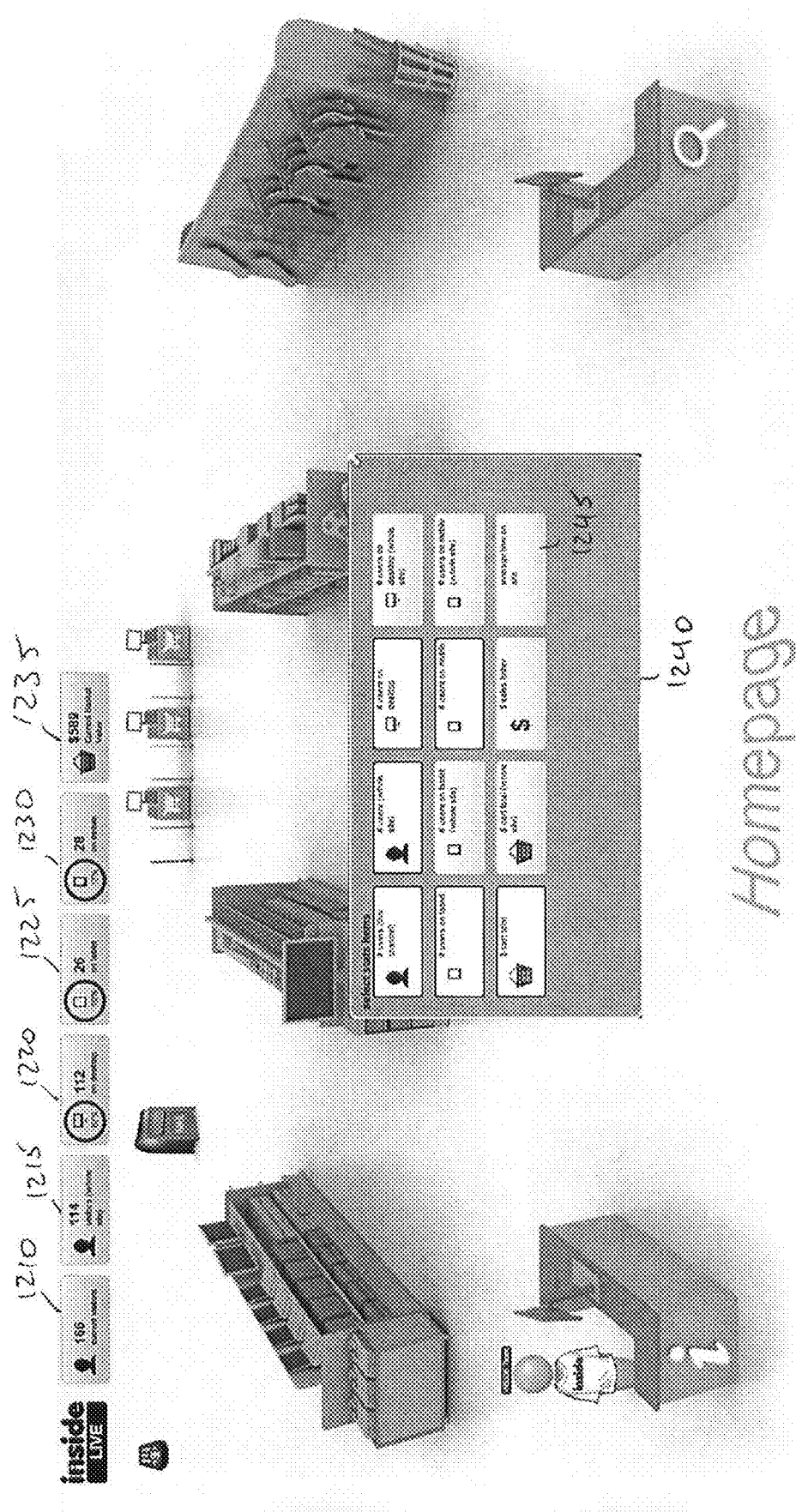

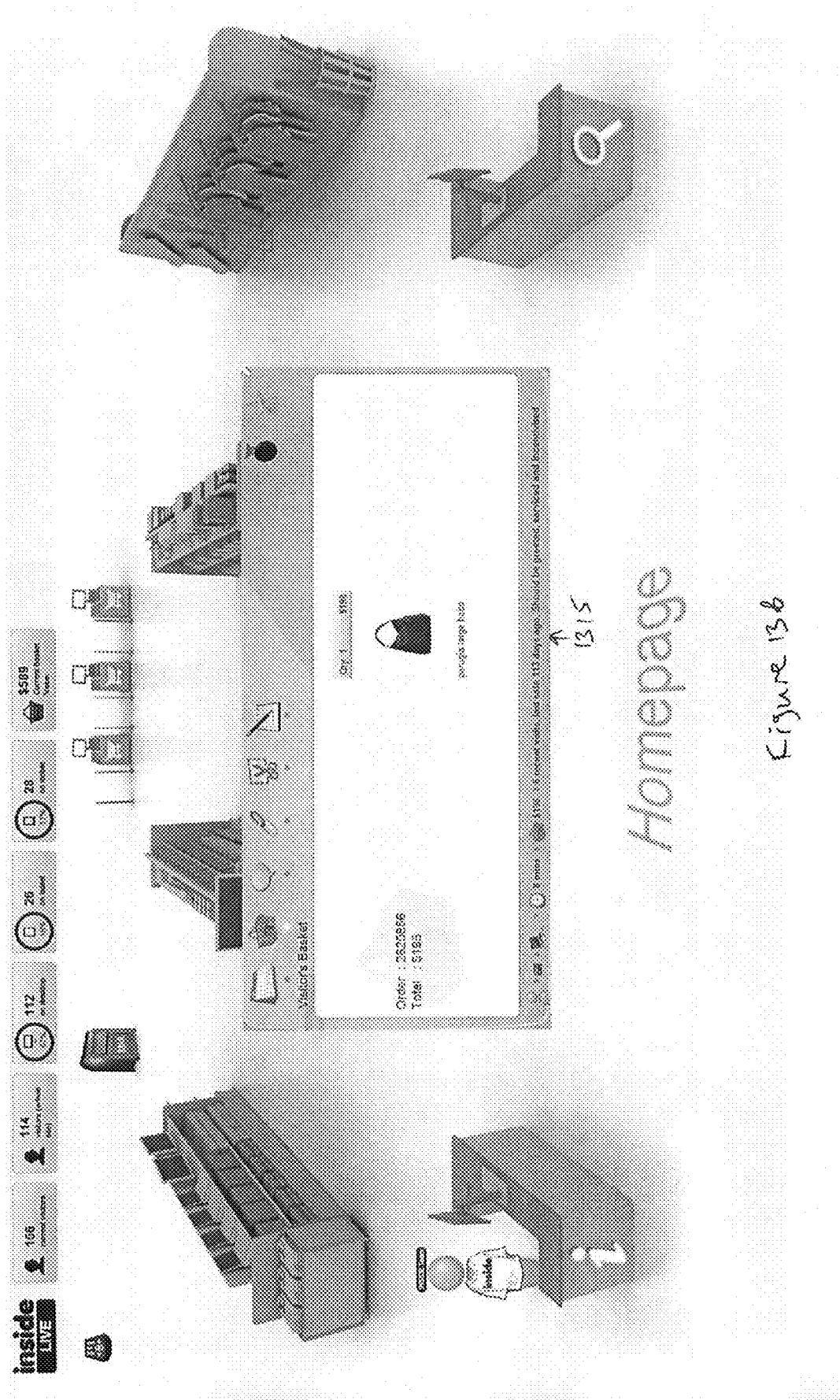

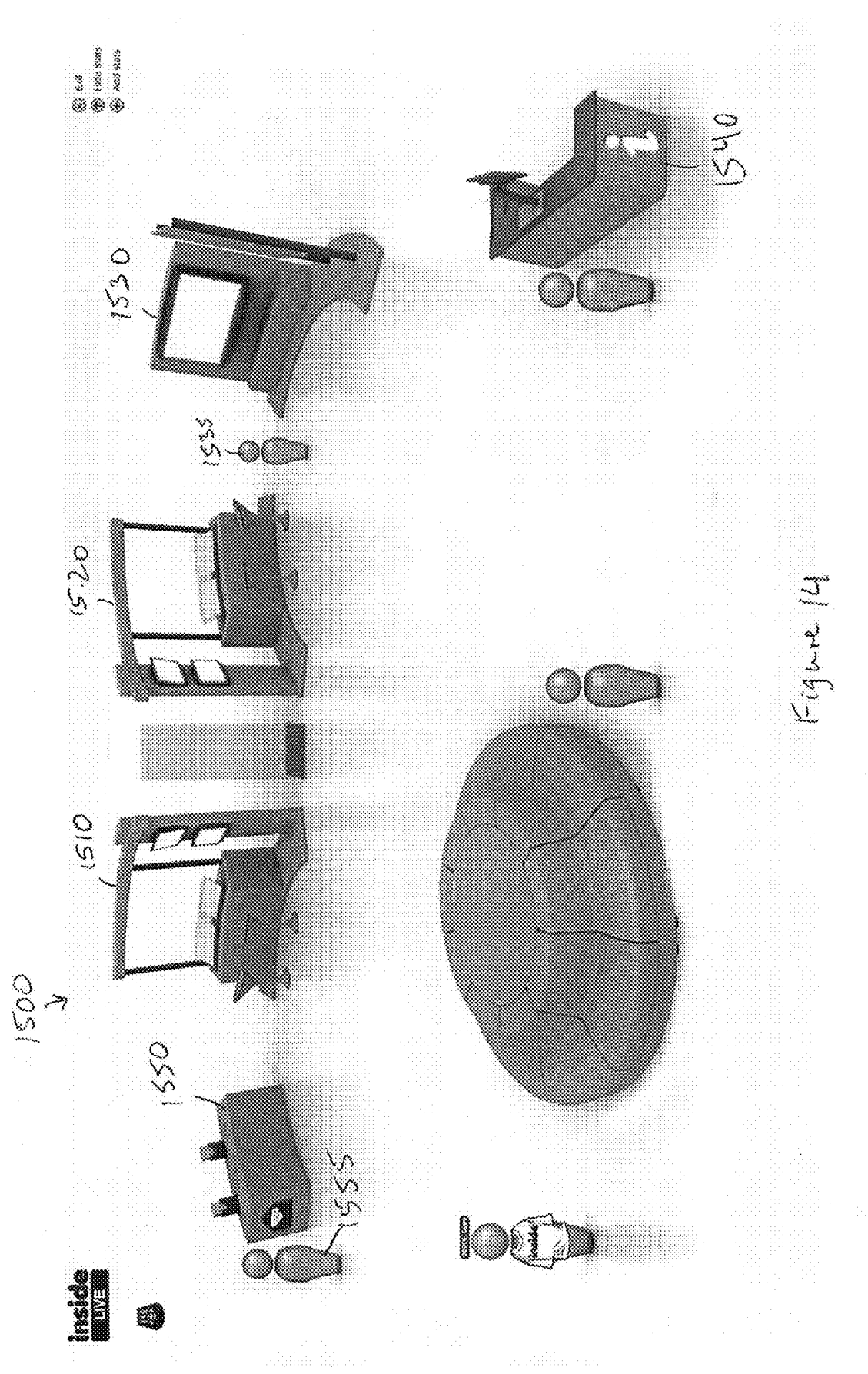

ONLINE STORE

CROSS REFERENCE TO RELATED APPLICATIONS

This application claims the benefit of U.S. Provisional Application No. 61/670,039, filed on Jul. 10, 2012, which is incorporated herein by reference in its entirety.

FIELD

The present invention relates to websites. More particularly, the present invention relates to how information is presented to an owner of the website.

BACKGROUND

As known in the art, owner of a website may be presented with a numerical information pertaining to users that visit the website. The owner may use different tools to accumulate numerical information about number of users visiting the website at any one time, the number of users that purchased from the website, and/or the number of users that are returning customers. However, this is an inefficient way of tracking users and their buying history.

In view of the limitation in prior art, a need exists for an improved way to provide information to the owner of a website.

BRIEF DESCRIPTION OF THE FIGURES

FIG. 12 depicts another embodiment according to the present disclosure;

FIG. 13a-e depict different embodiments according to the present disclosure;

FIG. 14 depicts another 3D representation of a website according to the present disclosure.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
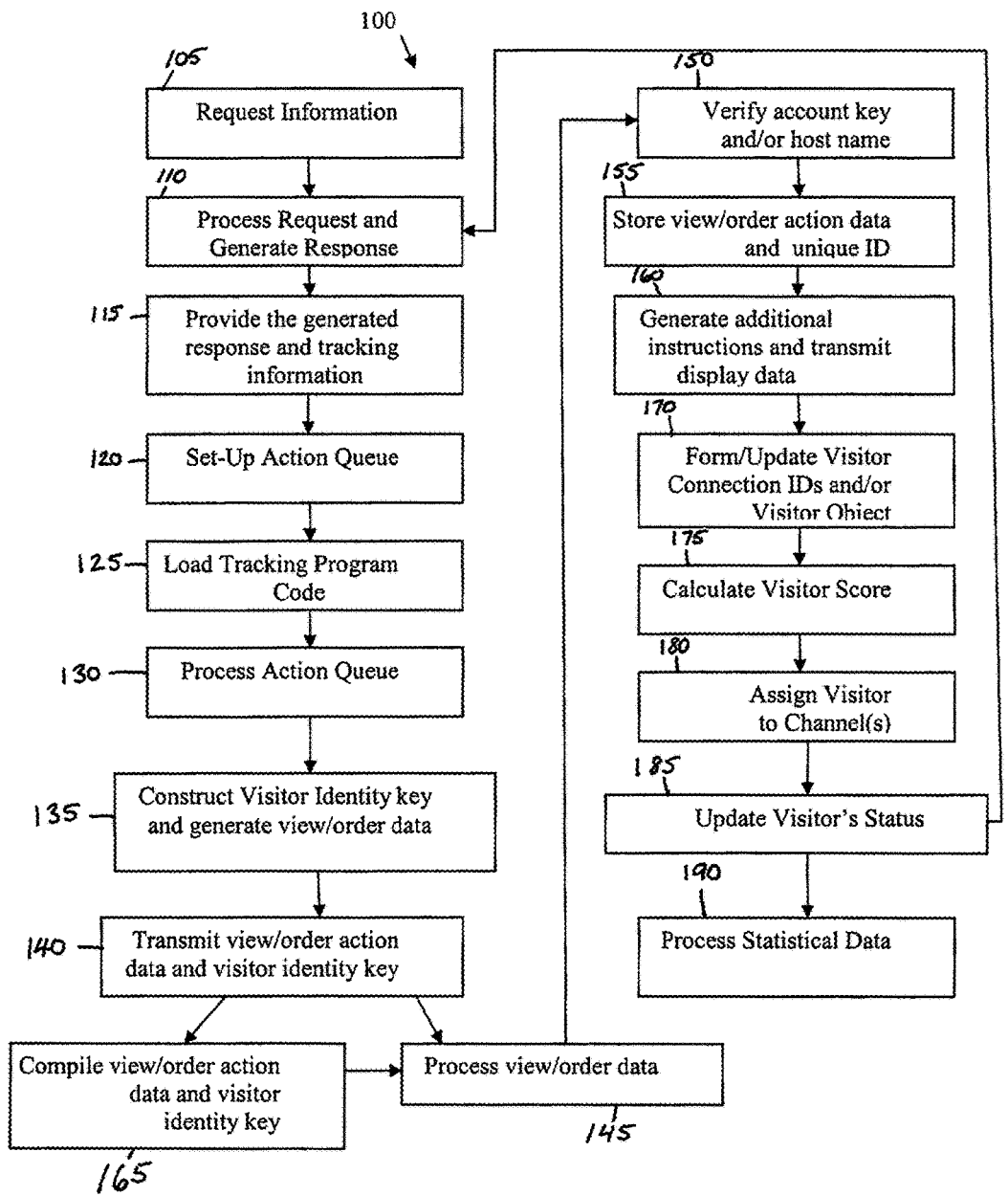
FIG. 1 depicts an embodiment of a system according to the present disclosure.
Figure 2:
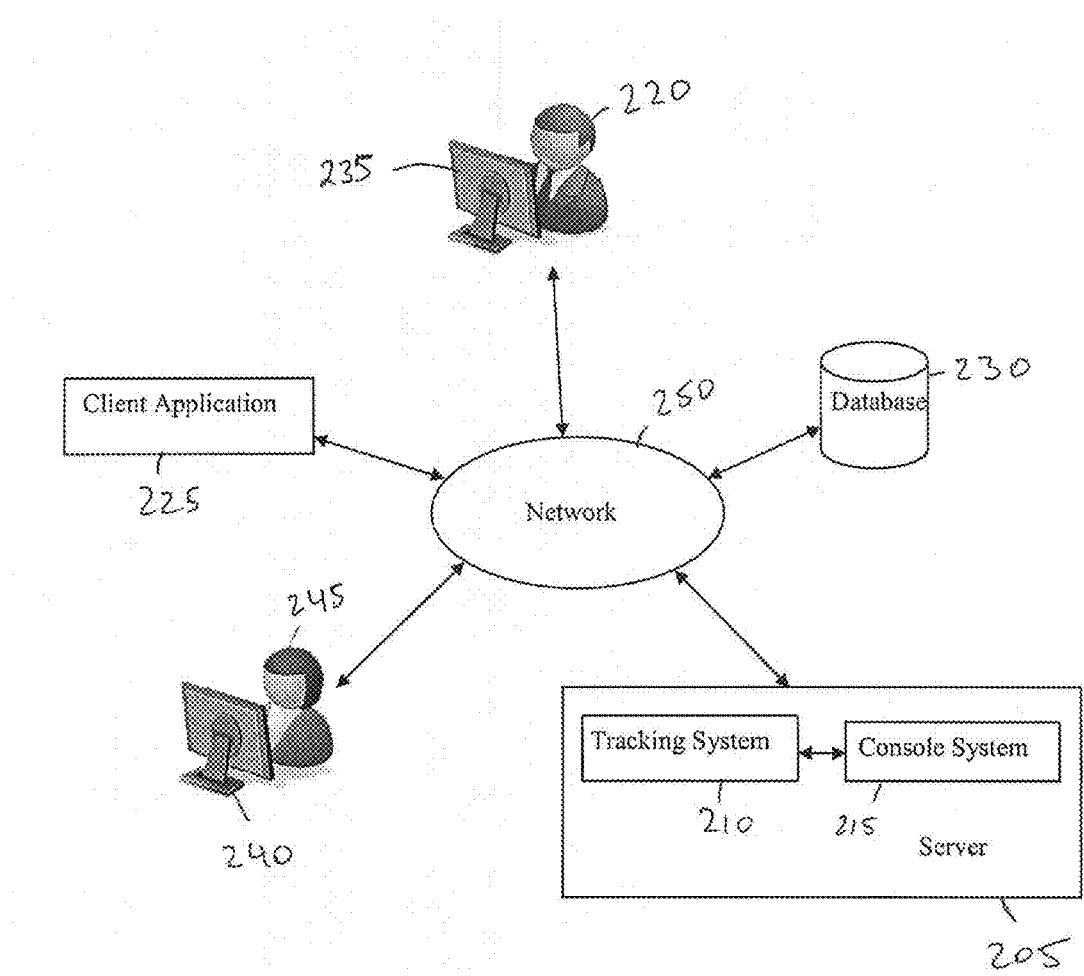
FIG. 2 depicts another embodiment of a system according to the present disclosure.

Referring to FIGS. 1 and 2, in one embodiment according to the present disclosure, the presently disclosed system 100 (shown in FIG. 1) is implemented using one or more servers 205 (shown in FIG. 2). In one embodiment, the one or more servers 205 comprise a tracking system 210 and a console system 215. The tracking system 210 is configured to process actions from one or more visitors 220 to a website hosted by a client application 225 and store the processed actions in a database 230. The tracking system 210 is further configured to forward the stored data to the console system 215 and to provide data and/or code to a visitor console 235 as described in more detail below.

Referring to FIG. 2, the console system 215 is configured to manage the real-time communication between the tracking system 210, visitor's console 235 and a user console 240. The console system 214 is also configured to group visitors 220 into channels and regularly update each channel's visitors as they move in and out of the channel as described in more detail below.

Referring to FIG. 2, the visitor console 235 represents a device used by one or more visitors 220 to interact and communicate with the website hosted by a client application 225. In one embodiment, the visitor console 235 used by the visitor 220 is a web browser (not shown). In another embodiment, the visitor console 235 used by the visitor 220 is a software application such as, for example, a mobile phone app (not shown).

Referring to FIG. 2, the client application 225 hosts one or more websites viewed by the visitor 220 and responds to a request for information from the visitor's console 235. In one embodiment, the client application 225 is configured to implement an Application Programming Interface (API) for communicating with the tracking system 210. The API may be implemented using JavaScript Object Notation (JSON) language or Extensible Markup Language (XML).

The user console 240 represents a device used by the owner of the website being viewed by the visitor 220 or their authorized representative (i.e. user 245) to monitor the real-time activity of all the visitors 220 communicating with the client application 225. In one embodiment, the user console 240 used by the user 245 is a web browser (not shown). In another embodiment, the user console 240 used by the user 245 is a software application such as, for example, a mobile phone app (not shown). In one embodiment, the user console 240 is configured to allow the user 245 to communicate with the visitor 220 directly through a real-time messaging system as described in more detail below.

In one embodiment, the tracking system 210, the console system 215, the visitor console 235, the user console 240 and the client application 225 communicate with each other through the network 250. The network 250 is internet, cellular network, local area network (LAN), wide area network (WAN) or a combination of two or more of these networks.

Referring to FIG. 1, in one embodiment, at 105 the visitor 220 uses visitor console 235 to load (i.e. access, request information from) the webpage hosted by the client application 225. At 110, the client application 225 processes the request from the visitor console 235 and generates a response (i.e. data). In one embodiment, the response generated at 110 is configured to provide executable instructions to the visitor console 235. The executable instructions may be implemented using Javascript™ or similar code. In another embodiment, the response generated at 110 comprises a pre-assigned account key. The pre-assigned account key is a unique identifier assigned to the client application 225 by the system 100. The pre-assigned account key comprises characters and/or number.

In another embodiment, the response generated at 110 comprises action(s). The actions are pieces of information that the user 245 is able to track about the visitor 220. In one example, the user 245 is able to track view action of the visitor 220. The view action is the page name the visitor 220 is currently viewing on the visitor console 235. In another example the user 245 is able to track item action of the visitor 220. The item action is the item(s) associated with the visitor 220's pending order such as unit price, description, sky and/or image. In another example, the user 245 is able to track order action of the visitor 220. The order action is visitor 220's order number, order total, and/or shipping total. It is to be understood that the presently disclosed system 100 is configured to allow the user 245 to also track other actions.

In another embodiment, the response generated at 110 comprises instructions for obtaining tracking program code from the tracking system 210 as described in more detail below.

At 115, the client application 225 transmits the generated response and tracking number to the visitor console 235 for processing. In one embodiment, the tracking number is a unique set of characters and/or numbers assigned to each website and/or the client application 225 implementing the system 100 according to the present disclosure.

At 120, the visitor console 235 configures (i.e. sets-up) an action queue. In one embodiment, the action queue is a globally accessible array of computer instructions to be executed by the visitor console 235. The action queue is configured based on the response generated at 110.

At 125, the visitor console 235 loads the tracking program code from the tracking system 210. In one embodiment, the tracking program code is configured to track visitor's views of the website hosted by the client application 225, build and track any orders placed by the visitor 220, construct a visitor identity key for the visitor 220 (as described in more detail below), and load any additional programs from the console system 215 and the tracking system 210 as required. In one embodiment, the tracking program code is implemented using Javascript™ or similar code.

At 130, the visitor console 235 uses the tracking program code to process the action queue configured at 120. At 135, the tracking program code generates a visitor identity key for the visitor 220 based on the action queue configured at 120. In one embodiment, the visitor identity key is generated based on attributes associated with the visitor console 235. For example, attributes associated with the visitor console 235 comprise the visitor console 235's IP address, the visitor console 235's screen size, the visitor console 235's operating system (OS), the visitor console 235's browser, and/or any other programs installed on the visitor console 235. In one embodiment, once generated, the visitor identity key is encrypted to form a 64 character key. In one embodiment, the visitor identity key is provided to the tracking system 210 to track visitor 220's actions on the website hosted by the client application 225. In another embodiment, at 135, the visitor console 235 uses the tracking program code to track what is being viewed and/or purchased by the visitor 220 and generate view/order action data based on what is being viewed and/or purchased by the visitor 220.

In one embodiment, at 140, the visitor console 235 transmits the view/order action data and/or the visitor identity key generated at 135 to the tracking system 210. At 145, the tracking system 210 processes the view/order action data. In one embodiment, at 145, the tracking system 210 processes the view/order action data to determine which website the visitor 220 is viewing, to determine the account key, and/or to determine that the domain name of the website being viewed by the visitor 220 matches one of the pre-authorized domain names stored in the database 230. At 150, the tracking system 210 verifies the validity of the account key and/or domain name. If there is an issue with the account key and/or the domain name, the view/order action data is not processed. If the account key and/or the domain name are verified and valid the view/order action data is assigned a unique ID that is stored in a database 230 at 155. In one embodiment, the view-order data stored in the database 230 is accessed (i.e. used) by the console system 215 to analyze visitor 220's viewing and/or shopping history.

In one embodiment, the presently disclosed system 100 automatically assigns unique ID to every website being viewed by the visitor 220, to every item being viewed by and/or purchased by the visitor 220.

In one embodiment, the unique ID stored in the database 230 is used to match the subsequent real-time connection to the visitor 220 and the particular page they are viewing. At 160, the tracking system 210 generates additional instructions based on the view/order action data and transmits them to the visitor console 235 for further processing. In one embodiment, the additional instructions generated at 160 are used by the visitor console 235 to load additional modules for use by the visitor 220. In one example, the additional instructions generated at 160 are used by the visitor console 235 to load a chat module to be used by the visitor 220 and the user 245 to communicate with each other. In another example, the additional instructions generated at 160 are used by the visitor console 235 to establish a real-time connection between the visitor console 235 and the console system 215 allowing for data to be pushed and pulled from either direction on the connection. Because each connection to the console system 215 is initially anonymous. The visitors ID and unique ID are passed through once this connection is established to verify to which visitor 220 the connection belongs to.

At 160, the tracking system 210 further transmits display data to the console system 215. The display data is a condensed form of the view/order action data. It contains all of the necessary information required to display an avatar on the user console 240 representing the actions of the visitor 220 as described in more detail below. The display day comprises the name of the visitor 220, type and thumbnail image of the page the visitor 220 is viewing, the order id and/or order total for visitor 220's active order (if applicable), visitor 220's visitor identity key (if applicable), and/or visitor console 235 type and location information.

In another embodiment, at 140, the visitor console 235 transmits the view/order action data and/or the visitor identity key generated at 135 to the client application 225. At 165, the client application 225 compiles the view/order action data and/or the visitor identity key in to the API format (as described above) and transmits it to the tracking system 210 for processing at 145 as described above. In one embodiment, the client application 225 provides additional information to the view/order action data before transmitting it to the tracking system 210. The additional information could be visitor 220's email address, personal info associated with visitor 220 that the client application 225 has about the visitor 220 or any other personal information associated with the visitor 220.

At 165, the console system 215 receives visitor's view ID and visitor ID from the visitor console 235 and stores them in the database 230 or any other memory that is associated with the console system 215. The view ID and the visitor ID are used by the console system 215 to identify each visitor for each connection. A visitor may have multiple connections if multiple websites are open using, for example, tabbed browsing.

At 170, the console system 215 generates or updates visitor 220's record based on the display data received from the tracking system 210 at 160. In one embodiment, the visitor 220's record is an up-to-date record of visitor 220's activity.

At 175, the console system 215 calculates visitor 220's score based on one or more metrics associated with the visitor 220. In one embodiment, the visitor 220's score is in the range of 0-100. In another embodiment, one of the visitor 220's metrics is based on the time it is taking the visitor 220 to process their online purchase (i.e. order age). For example, if the visitor 220 has an order that is 30% older than the predetermined time it should take to complete an order (where predetermined time it should take to complete an order is, for example, 15 minutes) and younger than 60 min, the visitor 220's score would be calculated as shown in Equation (1) below:

$$\text{Visitor's Score} = 50 + 50 * (\text{order age} - 19.5 \text{ minutes})/60 \quad (1)$$

Where 15 min+30%=19.5 min. In one embodiment, the maximum score assigned to the order age metric does not exceed 50.

In another embodiment, one of the visitor 220's metrics is based on the number of times the visitor 220 visits the website hosted by the client application 225 (i.e. session count). In one embodiment, the console system 215 stores time and date of each of visitor 220's visits to the website hosted by the client application 225. In one embodiment, the console system 215 stores the time and date of each of visitor 220's visits to the website hosted by the client application 225 in the database 230 or any other memory associated with the console system 215. For example, if session count is 2, the visitor 220's score would be calculated as shown in Equation (2) below:

$$\text{Visitor's Score} = (\text{session count} - 2) * 10 \quad (2)$$

In one embodiment, the maximum score assigned to the session count metric does not exceed 50.

In another embodiment, one of the visitor 220's metrics is based on the number of times the visitor 220 searches the website hosted by the client application 225 (i.e. search count). In one embodiment, the console system 215 stores the number of searches performed by the visitor 220 and/or search criteria used by the visitor 220. In one embodiment, the console system 215 stores the number of searches performed by the visitor 220 and/or search criteria used by the visitor 220 in the database 230 or any other memory associated with the console system 215. For example, Equation (3) may be used to calculate the visitor 220's score based on the number of searches performed by the visitor 220:

$$\text{Visitor's Score} = 0.5 * (\text{search count}) * (\text{search count} - 1) \quad (3)$$

In one embodiment, the maximum score assigned to the search count metric does not exceed 50.

In one embodiment, visitor 220's score is updated each time a new view, search or order action is tracked by the system 100.

At 180, the console system 215 assigns the visitor 220 to one or more channels (i.e. groups) based on channel filters. The console system 215 assigns visitors 220 into more manageable groups based on channel filtering to create one or more live views of the website hosted by the client application 225. In one embodiment, the console system 215 assigns all visitors 220 to a general channel. In another embodiment, the console system 215 assigns visitors 220 to channels based on channel filters. The channel filters allow for custom groupings of visitors 220. For example, channel filters may be configured to assign visitors 220 to different channels based on: Basket Order value ($), time spent on the website, specific named page hits, and/or searches conducted by the visitor 220.

In one embodiment, each channel is configured to handle (i.e. process) a predetermined number of visitors 220. For example, in one embodiment, the predetermined number of visitors 220 is set to 250 or any other number desired by the user 245. If the number of visitors 220 assigned to the channel reaches the predetermined number, the console system 215 will assign any additional visitors 220 to a new channel in the same category. For example, when general channel 1 becomes full and a new visitor 220 arrives at the website hosted by the client application 225, a new channel is automatically generated called general channel 2 and the new visitor 220 is assigned to that new channel instead of general channel 1 (shown in FIG. 13c).

At 185, the system 100 updates visitor 220's status every time there is a new process request at 110.

Figure 11:
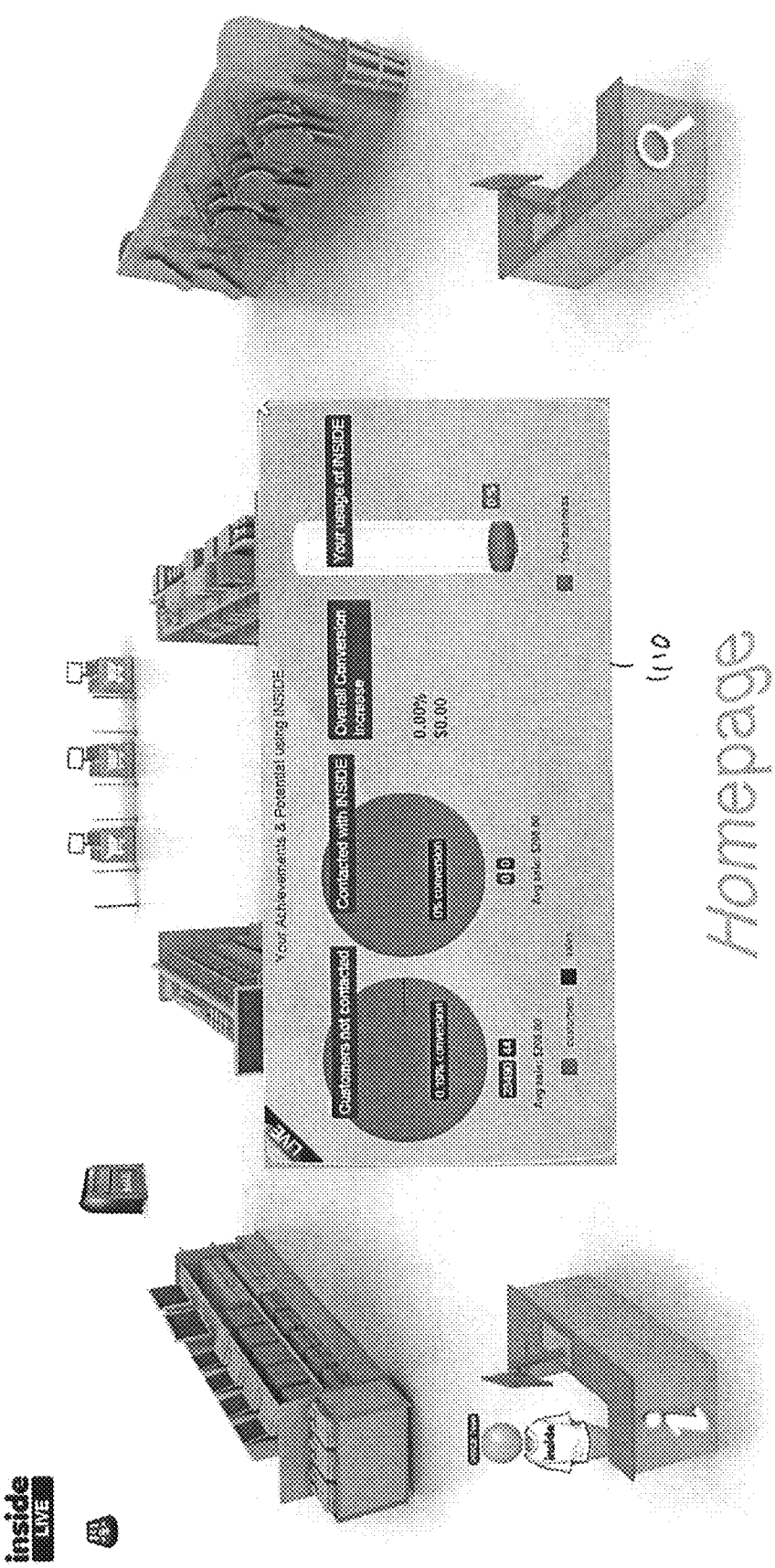
FIG. 11 depicts another embodiment according to the present disclosure.

At 190, the console system 215 processes statistical data based on the visitor 220's actions. In one embodiment, the processed statistical data is provided to user 245 and/or stored in the database 230 or any other memory associated with the console system 215. In one embodiment, the statistical data comprises conversion information. The conversion information calculates the conversion rates between visitors that were and were not communicated with using the system 100 to give an indication of the difference between visitor conversion where the system 100 was used to influence a visitor to make a purchase. An example of conversion information is shown in FIG. 11 and described in more detail below.

In another embodiment, the statistical data comprises site information. The site information provides basic website statistics to the user console 240 (as represented by FIG. 12 and is described in more detail below). The site information provides the number of visitors on the website, total number of daily sales, total daily sales total value, overall current basket value, the average visitor's 220 time spent on the site and the visitor's 220 average basket size.

In another embodiment, the statistical data comprises hot product information. The hot product information identifies the more popular product on the website being monitored by the user 245. The system 100 queries the database 230 for the most viewed product on the website. Once most viewed product is identified, the system 100 provides this information to the user 245 in a window 1369 as shown in FIG. 13e.

In another embodiment, the statistical data comprises huge basket information. The huge basket information identifies visitors 220 with a shopping cart value above a predetermined value. If a visitor 220 has a shopping cart with a value that is above the predetermined value, the system 100 flags this visitor to the user 245 as shown in FIG. 13d.

In another embodiment, the statistical data comprises news information. The news information notifies the user 245 if the sales on any particular day exceed the sales in the past 30 days. If the present day is the best day in the last 30 days, the system 100 shows breaking news to the user 245 that this is the best day of the month. If the present day is not the best day in the last 30 days, the system 100 compares the current total sales for the current hour to the best day's matching hour. If the day is currently ahead of the best day at the same hour show developing story message that today is currently forecast to be the best day for the current month.

Figure 3:
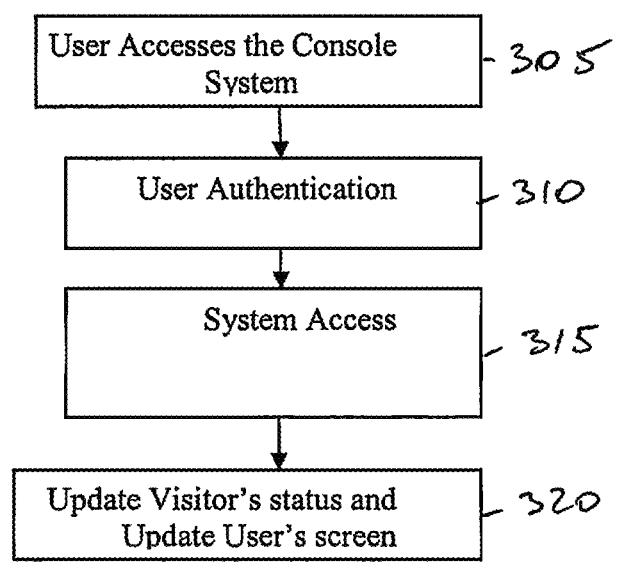
FIG. 3 depicts another embodiment of a system according to the present disclosure.

Referring to FIG. 3, at 305, the user 245 uses user console 240 to access the console system 215. In one embodiment, the user 245 provides a username/email and password to be logged into the console system 215. At 310, the console system 215 authenticates the user 245. At 315, once the user 245 is authenticated, the console system 215 allows the user 245 to select (i.e. view) one or more channels associated with user 245's account. In one embodiment, the user 245 is able to view the visitors 220 movements within the website hosted by the client application 225, view statistics/reports about the visitor 220, and/or query historical data associated with one or more visitors 220 as described in more detail below with reference to FIGS. 4-13.

In another embodiment, at 315, the user 245 is able to initiate chats with one or more visitors 220 and/or perform call outs to visitors 220 assigned to one or more channels associated with user 245's account. In one embodiment, at 315, the console system 215 creates a conversation object to track chats and/or call outs between the user 245 and the visitor(s) 220 and correctly forward messages to the correct visitor console 235. Call outs are simple short text based messages which can be broadcast to all visitors 220 assigned to a particular channel. In one embodiment, the call outs are used by the user 245 to notify all visitors 220 associated with one of the channels about a special offer on one or more products.

At 320, the console system 215 updates visitor 220's status every time the system 100 detects a change in, for example, what is being viewed, bought and/or searched by the visitor 220. At 320, the console system 215 updates the user console 235 to represent changes in visitor 220's status. In one embodiment, the console system 215 periodically (for example, every 10 seconds) scans through all the visitors 220 connections to determine if a visitor 220 is still connected to the website hosted by the client application 225. If the visitor 220 has been idle for a predetermined amount of time (for example, 3 to 5 minutes) the visitor 220 is flagged as sleeping (as described below with reference to FIG. 5, avatar 610). In one embodiment, if a visitor 220 has closed their browser and severed the connection to the console system 215 then that visitor 220's avatar is shown leaving the store via the bottom of the screen.

At 315, once the user 245 is authenticated, the console system 215 allows the user 245 to view (i.e. monitor) a 3 Dimensional (3D) graphical representation 400 (shown in FIGS. 4 and 14) of the website and the visitor 220's browsing of the website. It is to be understood that the 3D graphical representation can be changed (i.e. customized) to better represent the website being viewed. For example, a website selling groceries would have vegetable/fruit stands as part of its 3D graphical representation. It is to be understood that at least some of the objects displayed on the 3D graphical representation 400 correspond to a particular webpage and/or a product displayed (i.e. being sold) on the webpage. In one embodiment, the console system 215 allows the user 245 to view (i.e. monitor) the visitor 220's browsing of the website in real time. That means, the 3D graphical representation 400 will be updated by the system 100 in a matter of seconds if and when the visitor 220 looks at a different webpage on the website and/or looks at another product on the website.

Figure 4:
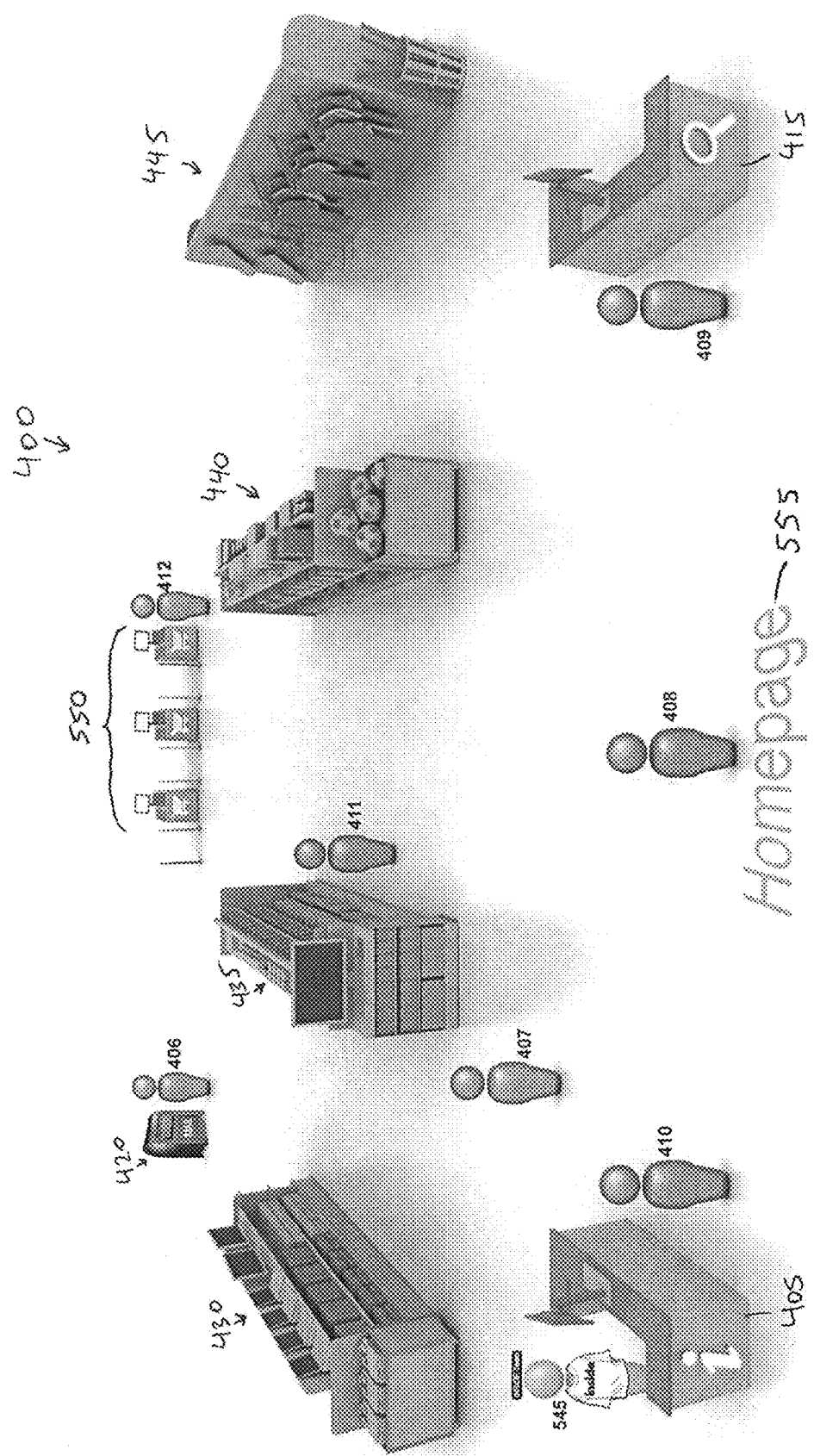
FIG. 4 depicts a 3 Dimensional (3D) representation of a website according to the present disclosure.

In one embodiment, the 3D graphical representation 400 provides a visual representation of a service (i.e. information) desk 405 as shown in FIG. 4. In one embodiment, the service desk 405 is a drawing of a desk with, for example, a symbol 'i' representing an information desk.

In another embodiment, the graphical representation 400 provides computer generated characters (i.e. avatars) 406-412 configured to represent the visitor 220 accessing (i.e. viewing) different pages of the website being viewed (i.e. monitored) by the user 245 using the system 100 presently disclosed. Although avatars 406-412 are depicted with heads and bodies, it should be understood that they may also be represented as dots, circles, rectangles or any other shapes.

In one embodiment, the avatar 410, depicted adjacent to the information desk 405, represents the visitor 220 when the visitor 220 is reading informational materials on website being viewed (i.e. monitored) by the user 245 using the system 100. Through the integration of the system 100 with the client application 225, the system 100 is provided with information about visitor 220's location on the website and the type of the page that the visitor 220 is looking at. If the visitor 220 is currently viewing a page that is information based (not a product based), then the system 100 is configured to position the avatar 410 representing the visitor 220 in the area adjacent to the desk 405. When viewing the graphical representation 400, the user 245 can easily see that the visitor 220 is reading informational materials.

In another embodiment, the graphical representation 400 provides a visual representation of a search desk 415 as shown in FIG. 4. In one embodiment, the search desk 415 is a drawing of a desk with, for example, a magnifying glass symbol to represent the search desk 415. The avatar 409 depicted adjacent to the search desk 415 represents the visitor 220 when the visitor 220 is searching for information on the website. Through the integration of the system 100 with the client application 225, the system 100 is provided with information about visitor 220's location on the site and the type of the page that the visitor 220 is looking at. If the visitor 220 is viewing the search results page, then the system 100 is configured to position the avatar 409 representing the visitor 220 adjacent to the desk 415.

In another embodiment, the graphical representation 400 comprises a visual representation of a mail box 420 representing, for example, an enquiry form on the website as shown in FIG. 4. The avatar 406 adjacent to the mail box 420 represents the visitor 220 when the visitor 220 is completing one or more enquiry forms on the website. Through the integration of the system 100 with the client application 225, the system 100 is provided with information about visitor 220's location on the site and the type of the page that the visitor 220 is looking at. If the visitor 220 is viewing the enquiry form page, then the system 100 is configured to position the avatar 406 representing the visitor 220 adjacent to the mail box 420.

In another embodiment, the graphical representation 400 comprises a visual representation of one or more merchandise aisles 430-445 (shown in FIG. 4) representing the product area of the website hosted by the client application 225. Avatar 411 adjacent to the merchandise aisle 435 represents the visitor 220 when the visitor 220 is browsing through the products for sale on the website. If the visitor 220 is viewing the product page, then the system 100 will move the avatar 411 representing the visitor 220 to the merchandise aisle 435. If the visitor 220 is viewing the product category page, then the system 100 will move the avatar 407 representing the visitor 220 to the end of the merchandise aisle 435.

In another embodiment, the graphical representation 400 comprises a visual representation of a checkout Area 550 representing the shopping basket pages. The avatar 412 adjacent to the Checkout Area 550 represents the visitor 220 when the visitor 220 is in the process of checking out (paying for purchases). If the visitor is interacting with one of the checkout or the shopping cart pages, then the system 100 will move the avatar 412 representing the visitor 220 adjacent to the checkout area 550.

In another embodiment, the graphical representation 400 comprises a homepage area 555 representing the homepage of the website being viewed by the visitor 220. The avatar 408 adjacent to the homepage area 555 represents the visitor 220 when the visitor 220 is viewing the homepage. If the visitor 220 is interacting with the homepage, then the system 100 will move (i.e. position) the avatar 408 representing the visitor 220 adjacent to the homepage area 555.

Figure 5:
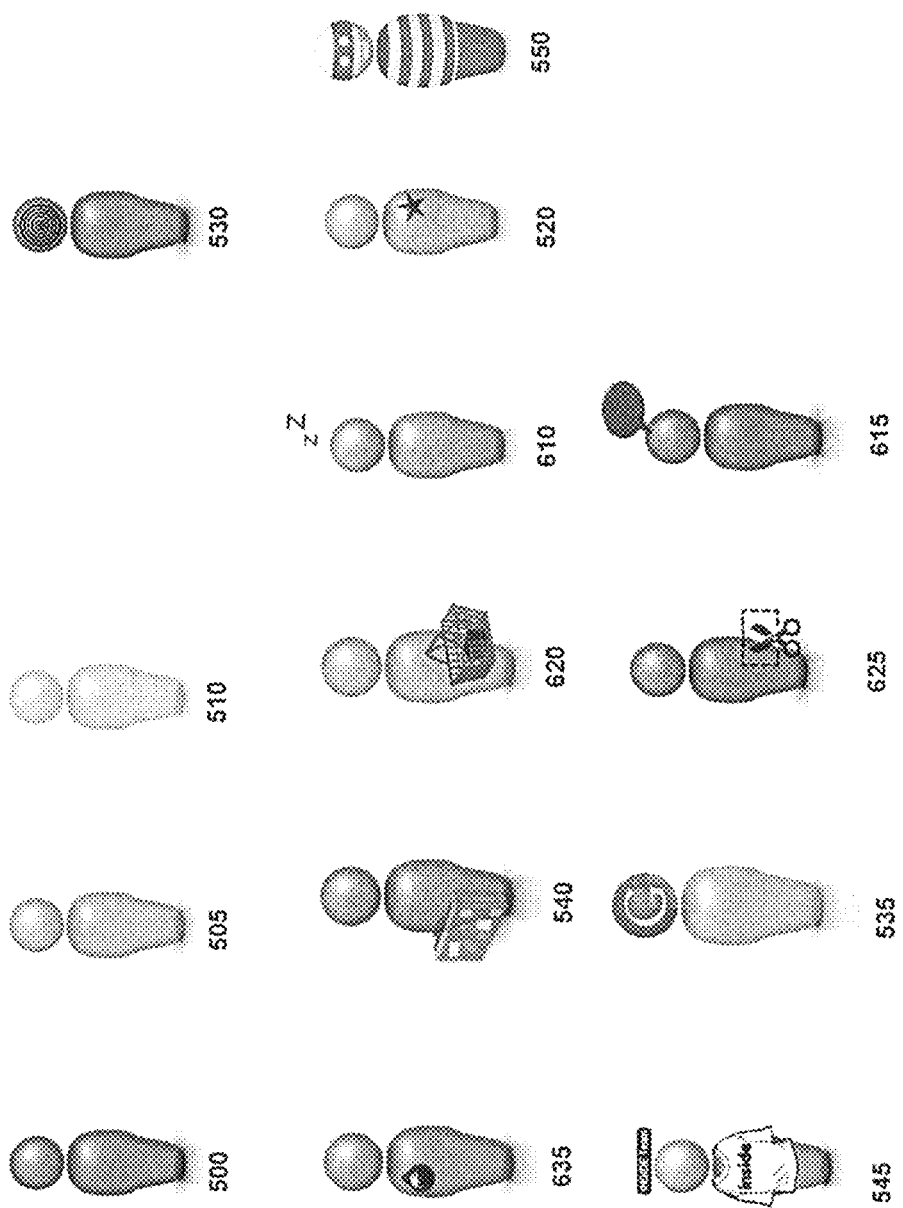
FIG. 5 depicts icons/avatars according to the present disclosure.
Figure 6:
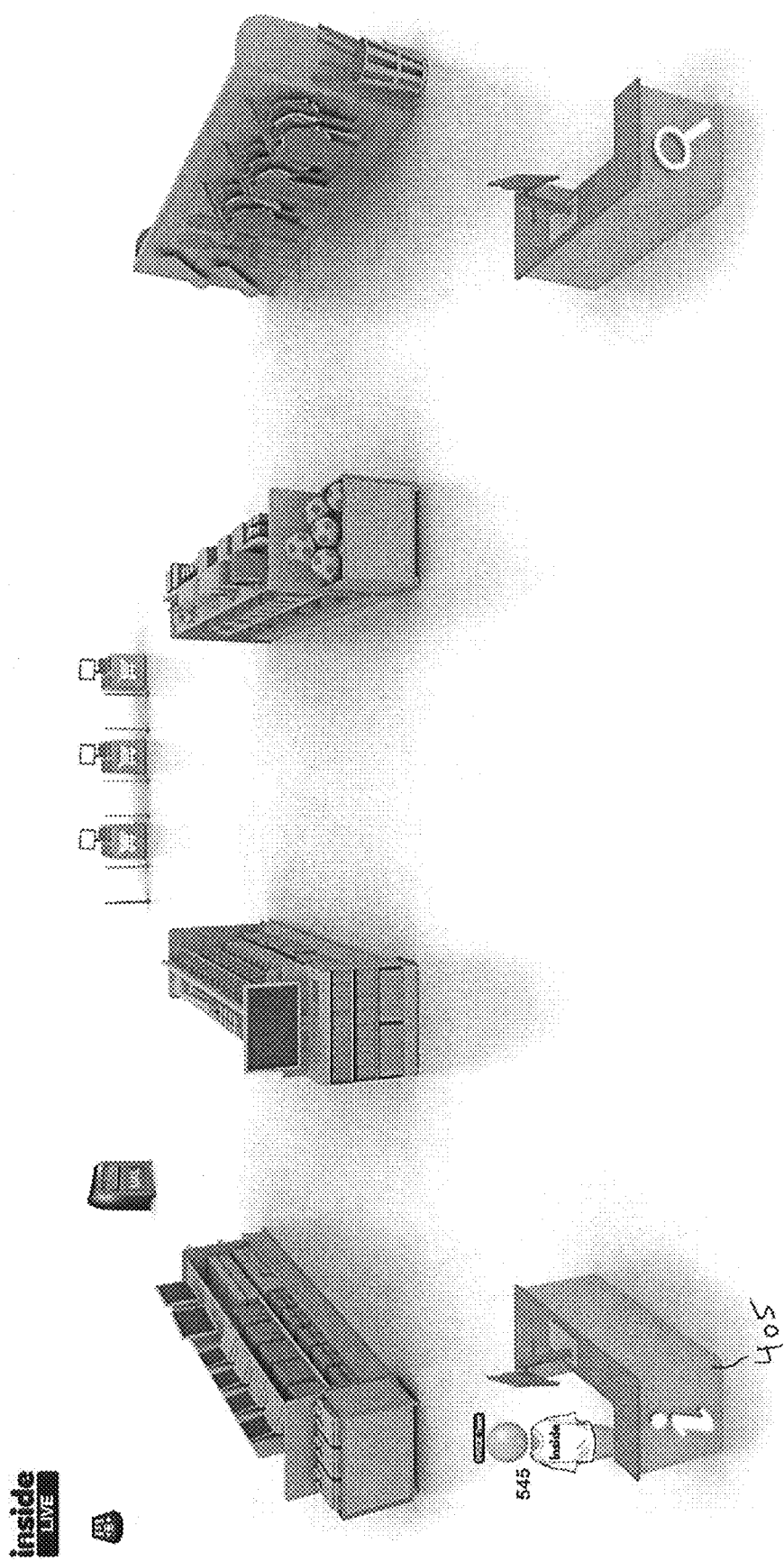
FIG. 6 depicts another 3D representation of a website according to the present disclosure.

In an exemplary embodiment, the system 100 may deliver statistical and factual information associated with site visitors by using different looking avatars. In one embodiment, FIG. 5 depicts different representations of avatars implemented by the system 100. An unknown visitor is, for example, represented as an avatar 500. The unknown visitor, represented by avatar 500, is the visitor that the system 100 is unable to find (i.e. obtain) any information for. The unknown visitor avatar 500 may be represented, for example, in a basic blue form or any other color, with no additional icons next to/on top of the avatar 500.

A returning visitor may be represented as an avatar 505. The returning visitor, represented by avatar 505, is the visitor that the system 100 is able to identify through the usage of computer cookies recorded on the visitor console 235 during visitor's previous visit to the website. The returning visitor avatar 505 may be represented, for example, in a basic yellow form or any other color, with no additional icons next to/on top of the avatar 505.

A logged in visitor may be represented by avatar 510. The logged in visitor, represented by avatar 510, represents the visitor who has logged in to the website and is known to the system 100 and/or the client application 225. The logged in visitor avatar 510 may be represented, for example, in a basic green form or any other color, with no additional icons next to/on top of the avatar 510.

A visitor that has made a purchase in the past or is considered to be a VIP consumer may be marked with a star as shown by avatar 520. The avatars 520 may be represented, for example, in a basic green form or any other color, with a star on the avatar's body.

A ranked visitor may be represented by an avatar 530. The ranked visitors 530 are the visitors that have been identified using the service's statistical information and the ranking formula as candidates for special attentions, in the form of a conversation. The avatar 530 may be represented, for example, in a basic red form or any other color, with one or more circles on the avatar's head.

A search engine bot may be represented by an avatar 535. The search engines bots 530 are the search engine programs that are visiting the site as they normally do. The avatar 530 may be represented, for example, in the basic white form or any other color, with, for example, the Search Engine Company's logo placed on the body.

An international visitor may be represented with by an avatar 540. In one embodiment, the international visitor is identified by the system 100 based on the visitor's IP address. The avatar 540 may be represented, for example, in the basic form with a suitcase next to the body.

In one embodiment, the user 245 is represented by a site assistant avatar 545. The site assistant avatar 545 may be represented with a t-shirt on top of the avatar body. The site assistant avatar 545 may be placed adjacent to the information desk 405 (shown in FIG. 6). If the user 245 selects any of the visitors' avatars displayed in the graphical representation 400, the system 100 positions the site assistant avatar 545 adjacent to the selected visitor's avatar.

Intruders are visitors who are identified by the system 100 as potentially capable of fraudulent transactions, or are arriving from an IP addresses that are associated to online criminal activities. In one embodiment, a list of IP addresses associated with inline criminal activities is provided to the system 100 by a third party databases. The Intruders may be represented with an avatar 550 that looks like a prisoner or pirate.

In another embodiment, an avatar 610 is used to identify a non-active visitor as shown in FIG. 5. Through the integration of the system 100 with the client application 225, the system 100 is provided with information about each visitor's location and the time of arrivals at that location. If the time of the last page that the visitor 220 was viewing is older than the predetermined active time period, then the system 100 may replace the visitor 220's avatar with an avatar 610. In one embodiment, the avatar 610 is represented with a Zzz symbol.

In one embodiment, an avatar 615 is used to represent a visitor chatting with the site operator (represented by avatar 545) or with the user 245. In one embodiment, the avatar 615 is represented with a chat symbol.

In one embodiment, an avatar 620 is used to represent a visitor that has added a product to their shopping cart, meaning the visitor has an intention of buying the product. In one embodiment, the avatar 620 is represented with a shopping basket.

In one embodiment, an avatar 625 is used to represent a visitor that has received a promotion (coupon) from, for example, the site operator (represented by avatar 545). In one embodiment, the avatar 625 is represented with scissors.

Figure 7:
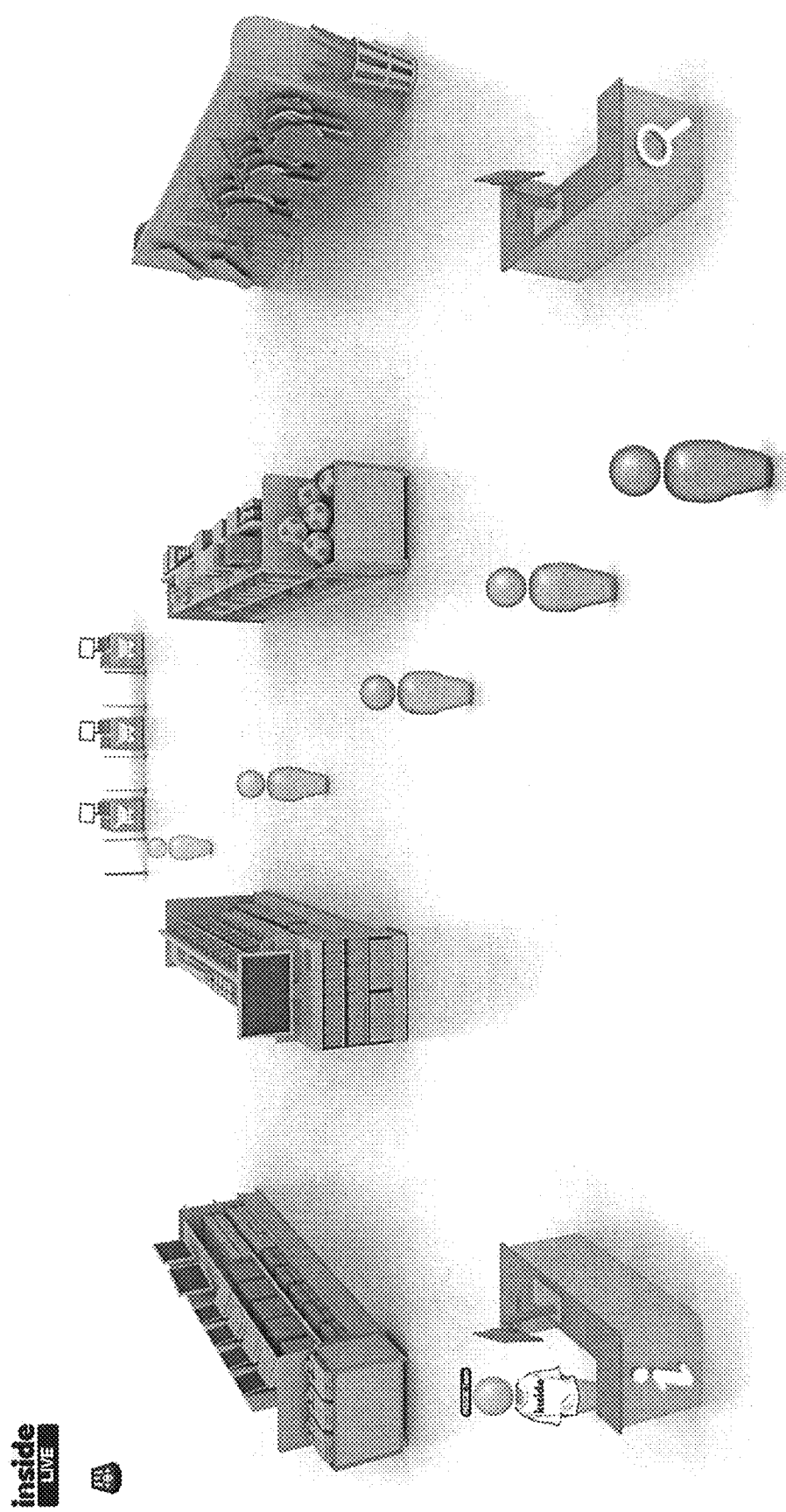
FIG. 7 depicts another 3D representation of a website according to the present disclosure.

Referring to FIG. 7, in one embodiment, the system 100 is configured to move the avatars to the various positions in the graphical representation 400 based on the visitor's location on the website. The avatars are displayed in various sizes according to the distance in location from the bottom of a screen being viewed by the user 245. As the avatar moves away from the bottom of the screen, the system 100 is configured to reduce the avatar size. In another embodiment, the system 100 is configured to move avatars in animated way.

Figure 8:
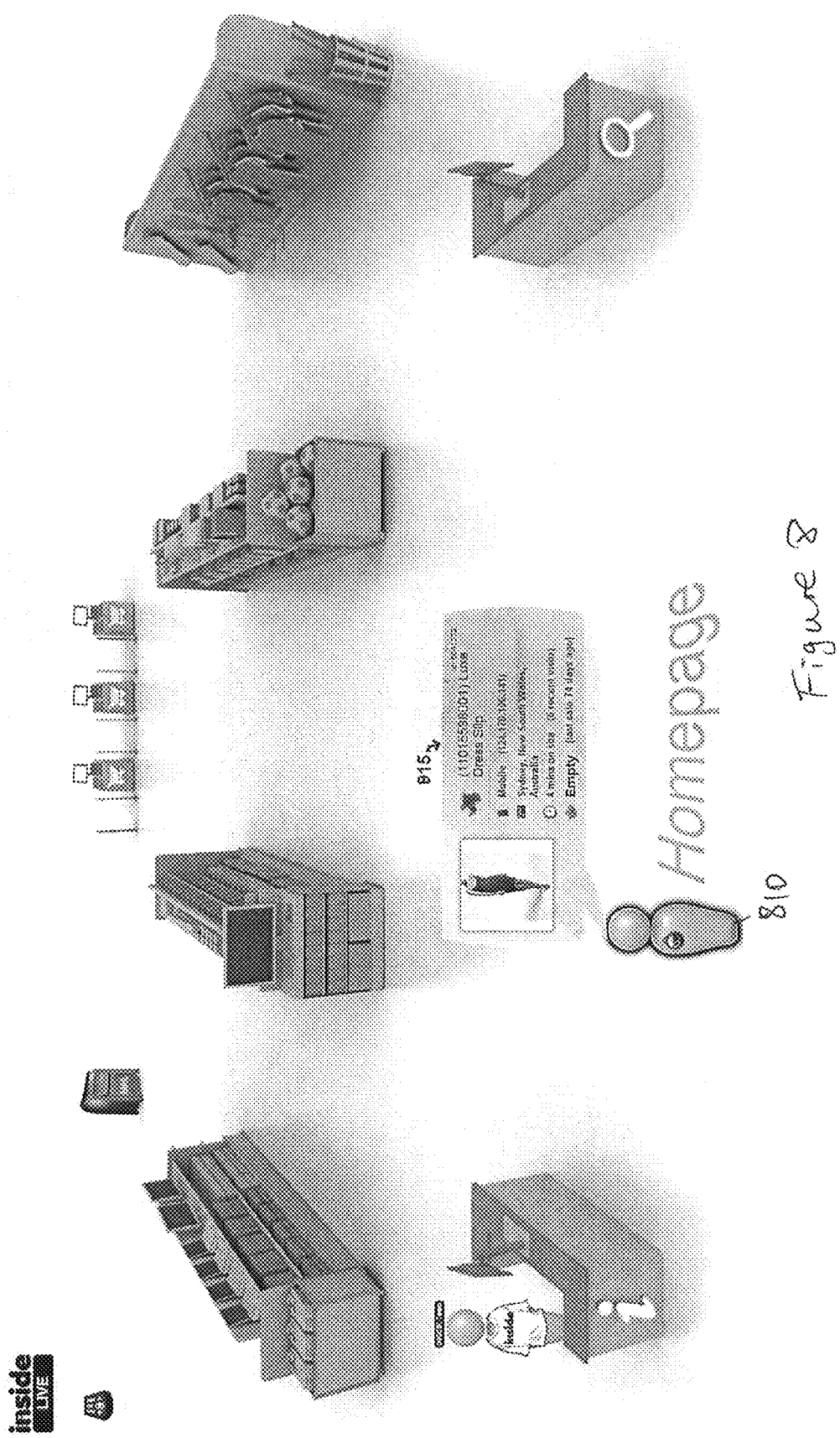
FIG. 8 depicts an embodiment according to the present disclosure.

In another embodiment, the system 100 is configured to allow the user 245 to hover over any avatar displayed in the graphical representation 400 and view the statistics of the visitor as shown in FIG. 8. Once user 245's pointing device (mouse) is hovering over the avatar 810, the avatar 810 may grow in size and the statistics information 815 will be displayed adjacent to the avatar 810. The statistical information may comprise, for example, a) Last Viewed Product, b) Last Visit, c) Last Purchase(s), d) Country, e) Device Used, or f) Time Currently Spent on the Site.

Figure 9:
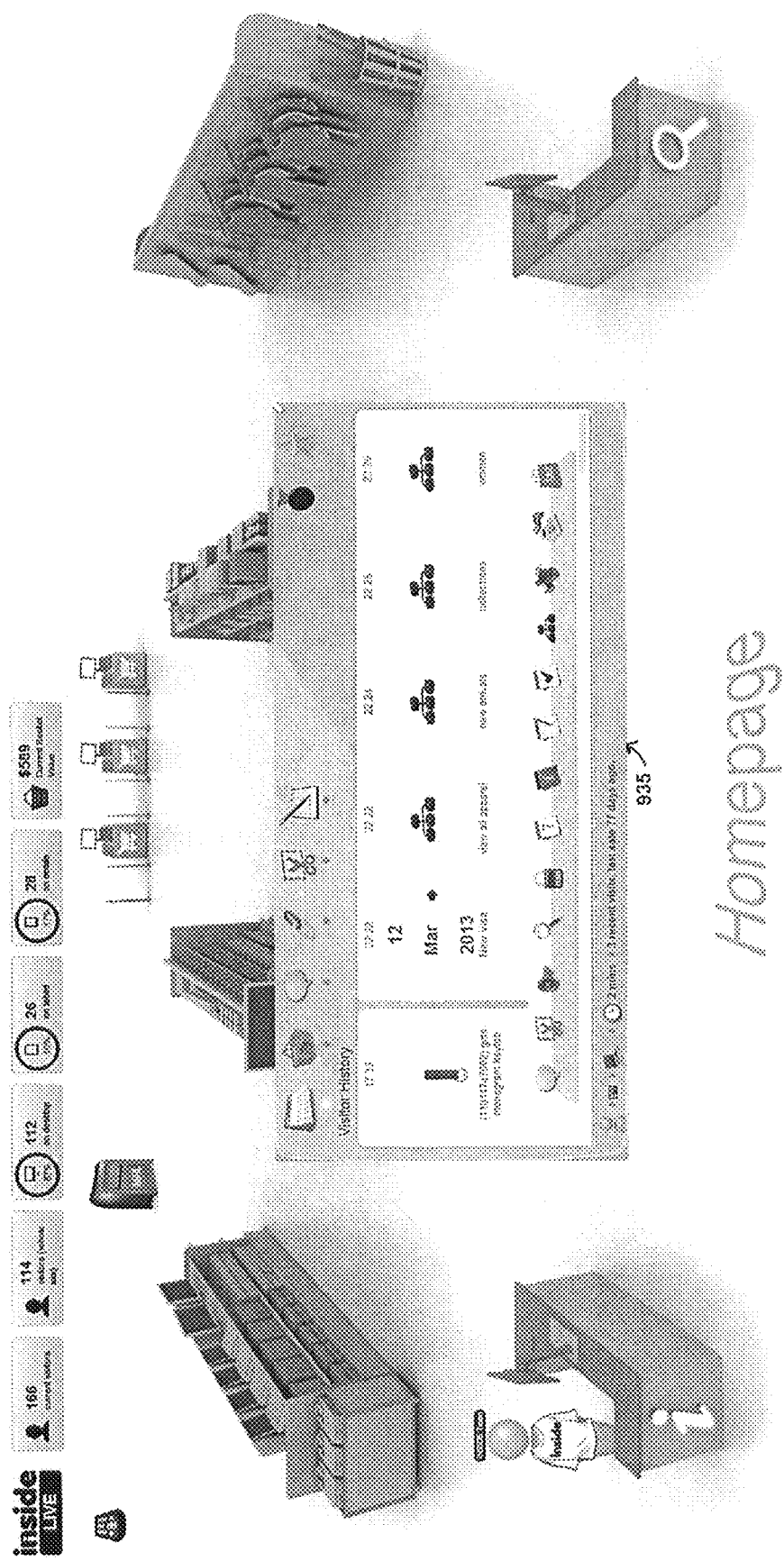
FIG. 9 depicts another embodiment according to the present disclosure.

In another embodiment, the system 100 is configured to allow the user 245 to click on any avatar displayed in the graphical representation 400 and view the statistics of the visitor simply by clicking on the visitor's avatar. The statistics information may be displayed within a pop-up window 935 in a number of sections as shown in FIG. 9. The statistics information may include:

Avatar's type and description
Device currently used
Previous visits to the site
Past purchases
Summary of purchase/year
Previous chats with the Operators
Previous given coupons and outcomes The pop-up window 935 displays a full history of the visitor's viewed pages since the system 100 started tracking them.

Figure 10:
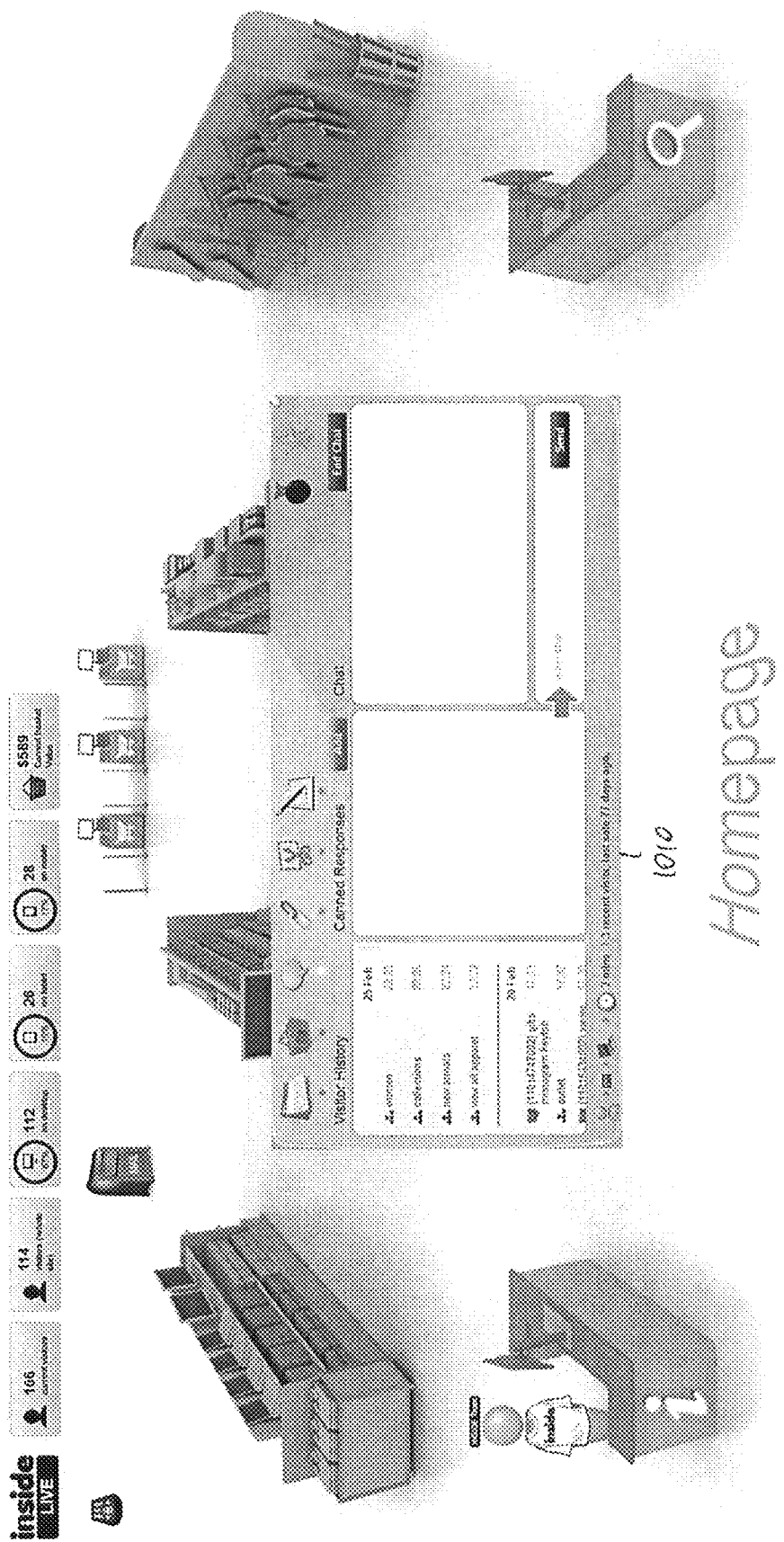
FIG. 10 depicts another embodiment according to the present disclosure.

Referring to FIG. 10, in another embodiment, the system 100 is configured to allow the user 245 to communicate with the visitor 220 by clicking on an avatar representing the visitor 220. Once the user 245 clicks on a visitor's avatar, a pop-up window 1010 pops-up on the user 245's screen to provide functionality required to communicate with the visitor via text and/or an audio.

Referring to FIG. 11, in another embodiment, the system 100 is configured to allow the user 245 to click on the stats icon (not shown) and view the statistics information pertaining to the website being monitored. The statistics information may be displayed within a pop-up window 1110 and may include:

Total Number of Visitors 220 contacted and converted to make a Purchase by the user 245 using the user console 240
Total Number of Visitors not contacted but still converted to a Purchase
Average Sale Amount of Visitors 220 not contacted by the user 245
Average Sale Amount of Visitors 220 contacted by the user 245
Overall Conversion Increase between the visitors 220 that purchased and were contacted and not contacted by the user 245
The % usage by the user 245 of the system 100 against other user's 245 using the system 100.

Referring to FIG. 12, in another embodiment, the system 100 is configured to provide the user 245 with icons 1210, 1215, 1220, 1225, 1230, 1235, 1240, 1245 representing, for example, total number of current visitors on the website (1210), total revenue potential (1235), total sales for the day, average visitor time spent on the site (1245) and/or number of visitors on different devices (1220, 1225, 1230).

Figure 13A:
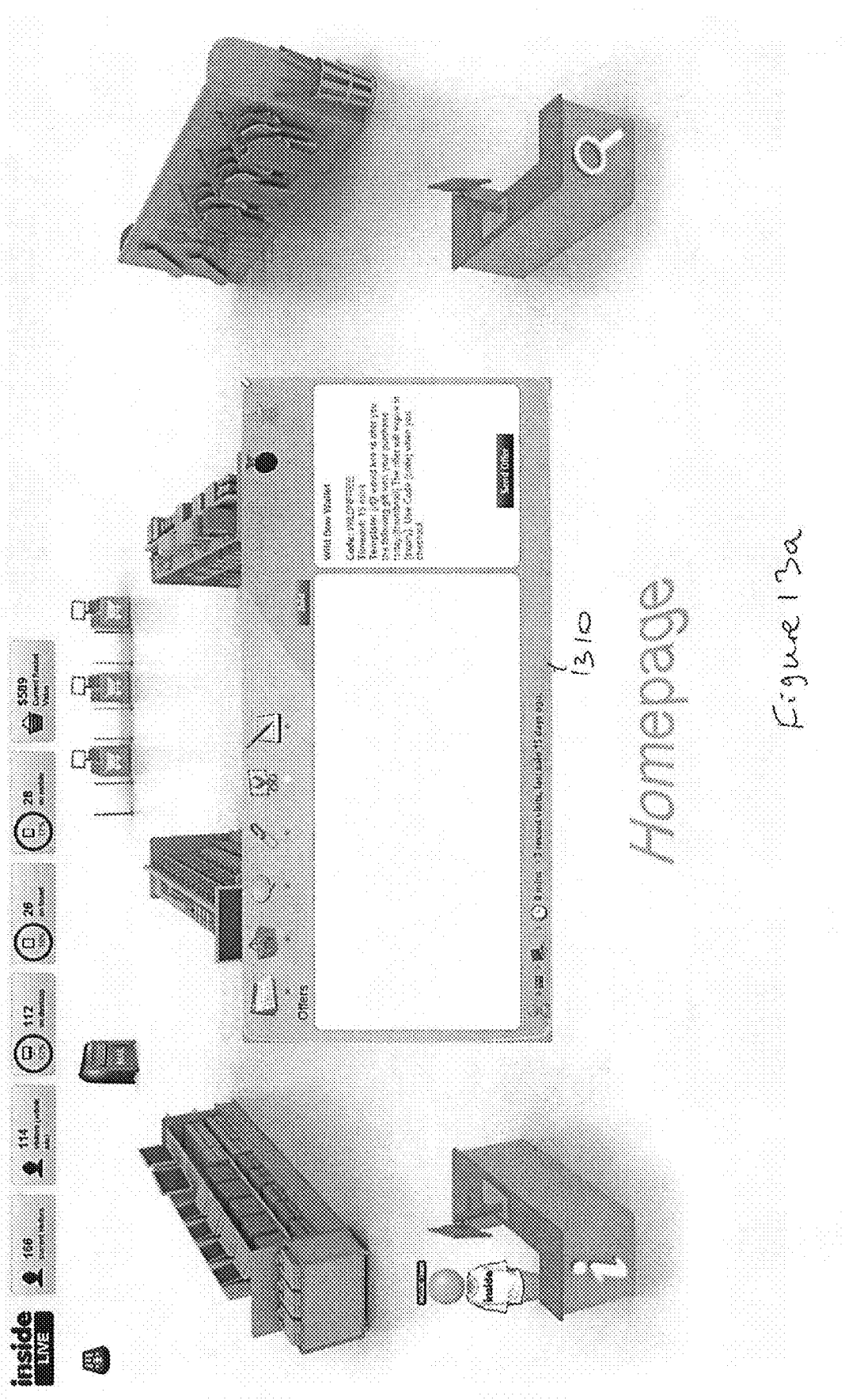

Referring to FIG. 13a, in another embodiment, the system 100 is configured to allow the user 245 to click on an avatar representing a visitor 220 to the website and view an offer window 1310. The offer window 1310 provides the user 245 with a list of offers (i.e. coupons) that can be offered to the visitor being tracked.

Referring to FIG. 13b, in another embodiment, the system 100 is configured to allow the user 245 to click on an avatar representing a visitor 220 to the website and view a basket window 1315. The basket window 1315 provides the user 245 with a list of items (i.e. products) that are in the visitor's shopping cart and the total of the items in the shopping cart.

Figure 13C:
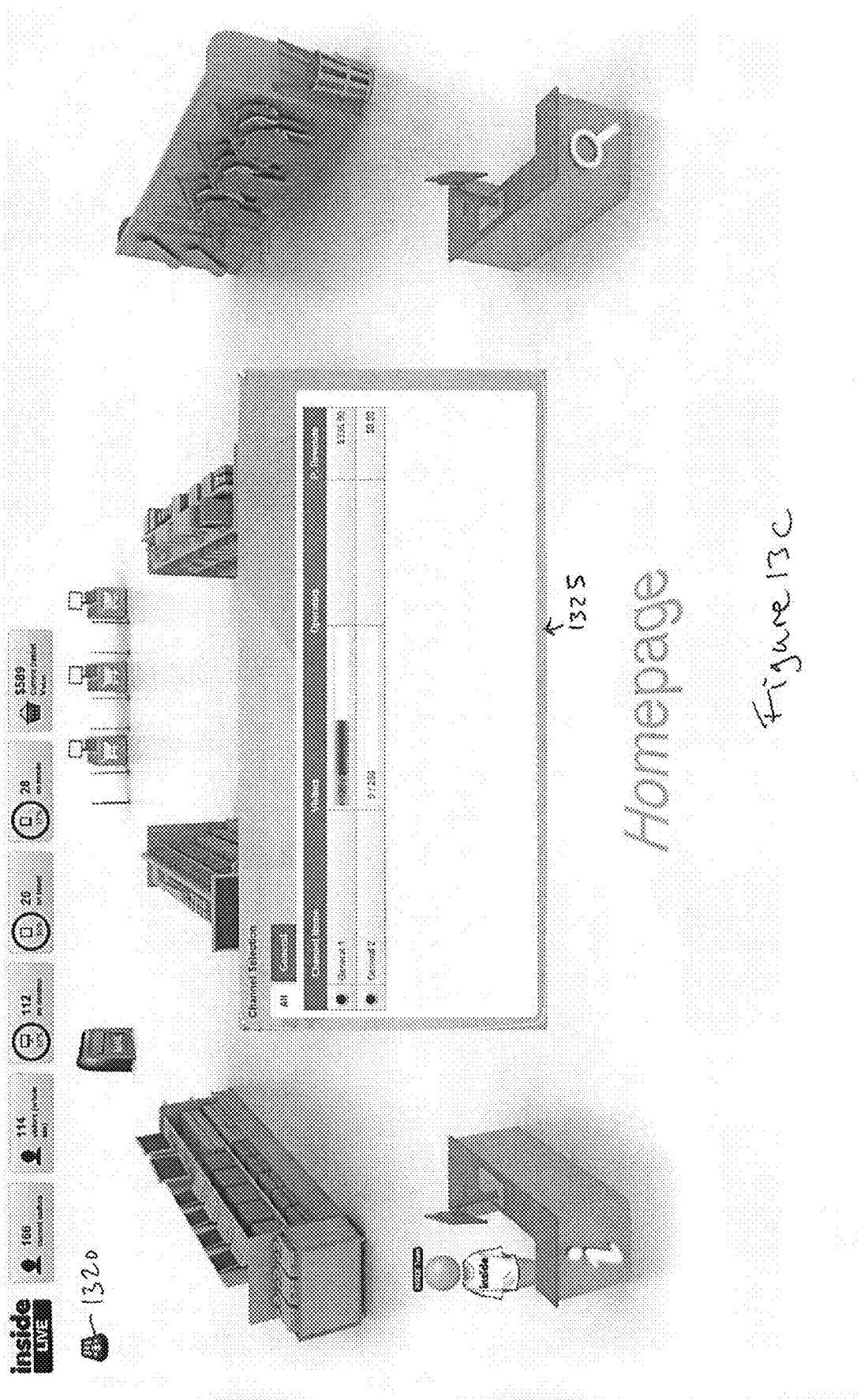
Figure 13D:
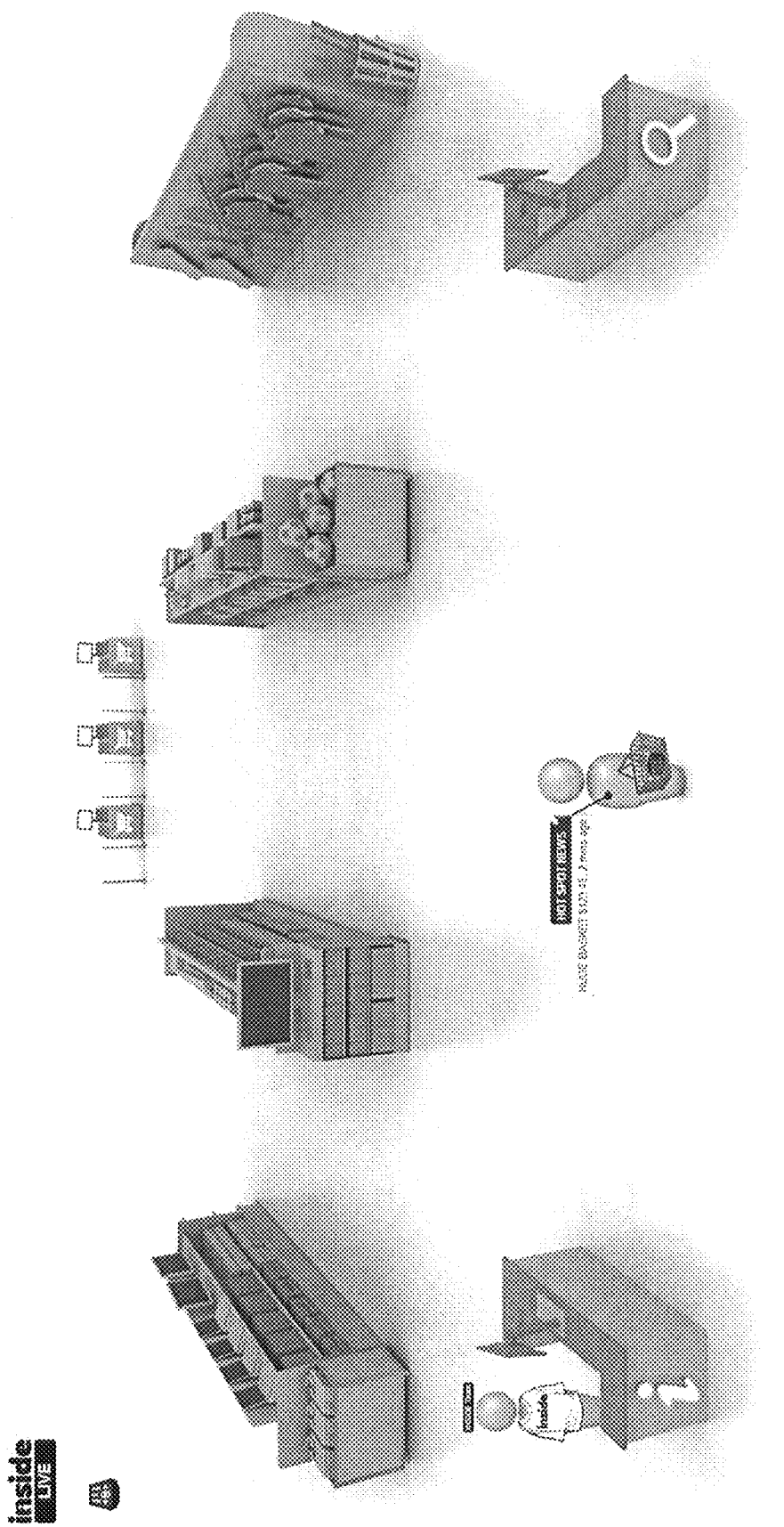
Figure 13E:
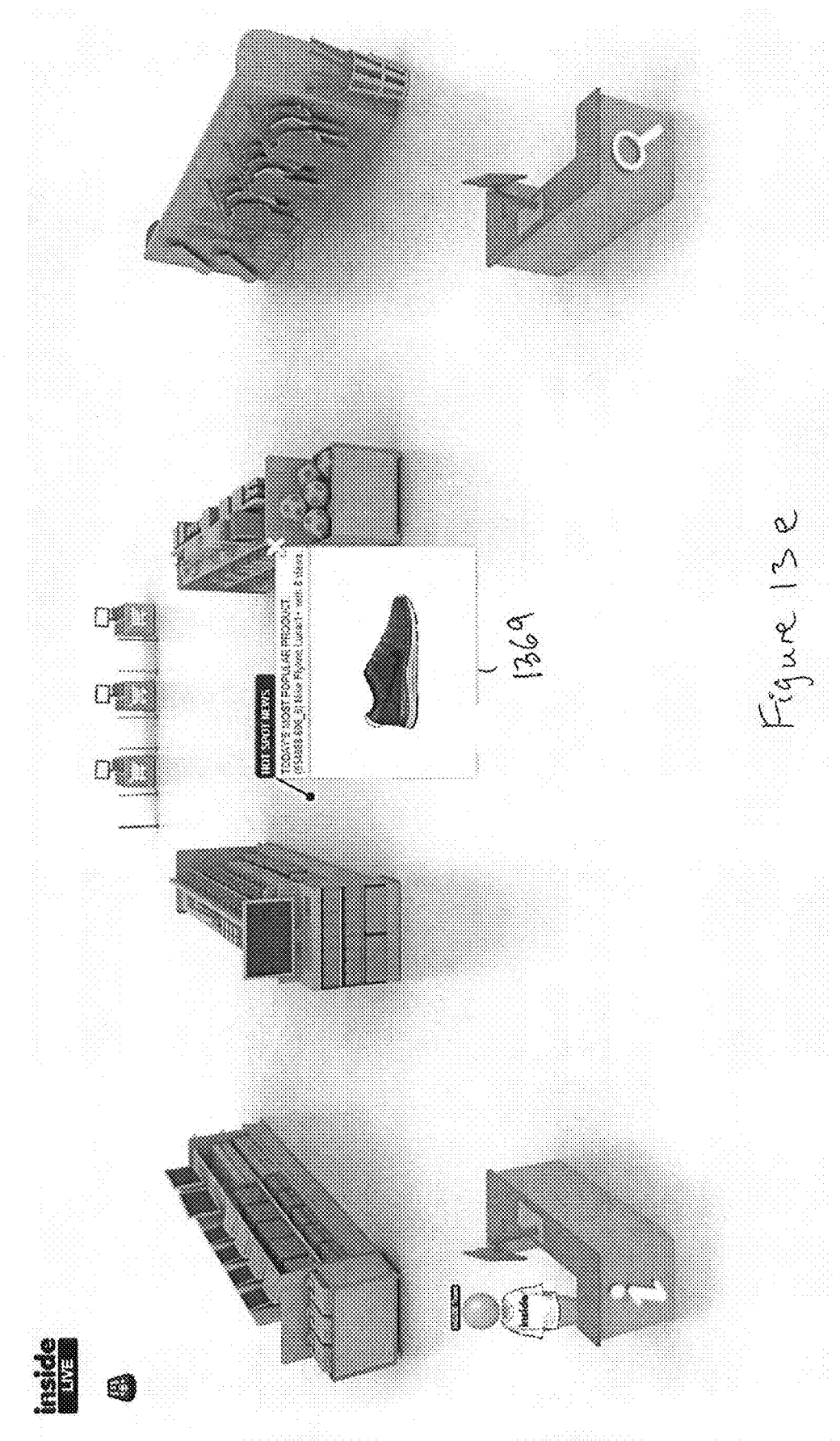

Referring to FIG. 13c, in another embodiment, the system 100 is configured to allow the user 245 to click on a channel icon and view the channel window 1325. The channel window 1325 presents the user 245 with a list of channels to which visitors are assigned at 180 as described in detail above.

Referring to FIG. 14, in an exemplary embodiment, a 3D graphical representation 1500 is shown. The graphical representation 1500 represents a brochure type of a website implementing the system 100 presently disclosed. The graphical representation 1500 may depict a visual representation of Exhibition Stands 1510, 1520, 1530 representing information pages on the brochure type of a website. Avatar 1535 adjacent to the Exhibition Stand 1530 represent a visitor that is browsing through the information on a non-transactional website. The system 100 presently disclosed implements the graphical representation 1500 based on information about each visitor's location on the site and the type of the page that the visitor is looking at. If the page is an information based page, then the system 100 will move the avatar 1535 representing a specific visitor to the Exhibition Stand area associated with page being viewed.

In one embodiment, the 3D graphical representation 1500 provides a visual representation of a service (i.e. information) desk 1540 as shown in FIG. 14. In one embodiment, the service desk 1540 is a drawing of a desk with, for example, a symbol 'i' representing an information desk.

In another embodiment, the graphical representation 1500 comprises a visual representation of a mail box 1550 representing, for example, an enquiry form on the website as shown in FIG. 14. The avatar 1555 adjacent to the mail box 1550 represents the visitor 220 when the visitor 220 is completing one or more enquiry forms on the website. Through the integration of the system 100 with the client application 225, the system 100 is provided with information about visitor 220's location on the site and the type of the page that the visitor 220 is looking at. If the visitor 220 is viewing the enquiry form page, then the system 100 is configured to position the avatar 1555 representing the visitor 220 adjacent to the mail box 1550.

It is to be understood that the presently disclosed system 100 can track thousands of visitor viewing/shopping on the website being viewed (i.e. monitored) by the user 245. Each avatar can represent actions of each one of those visitors. As each visitor visits different pages of the website, their avatar will be repositioned on the 3D graphical representation 400 or 1200 to reflect each visitors' actions. In one embodiment, the avatar is repositioned in an animated way.

Figure 15:
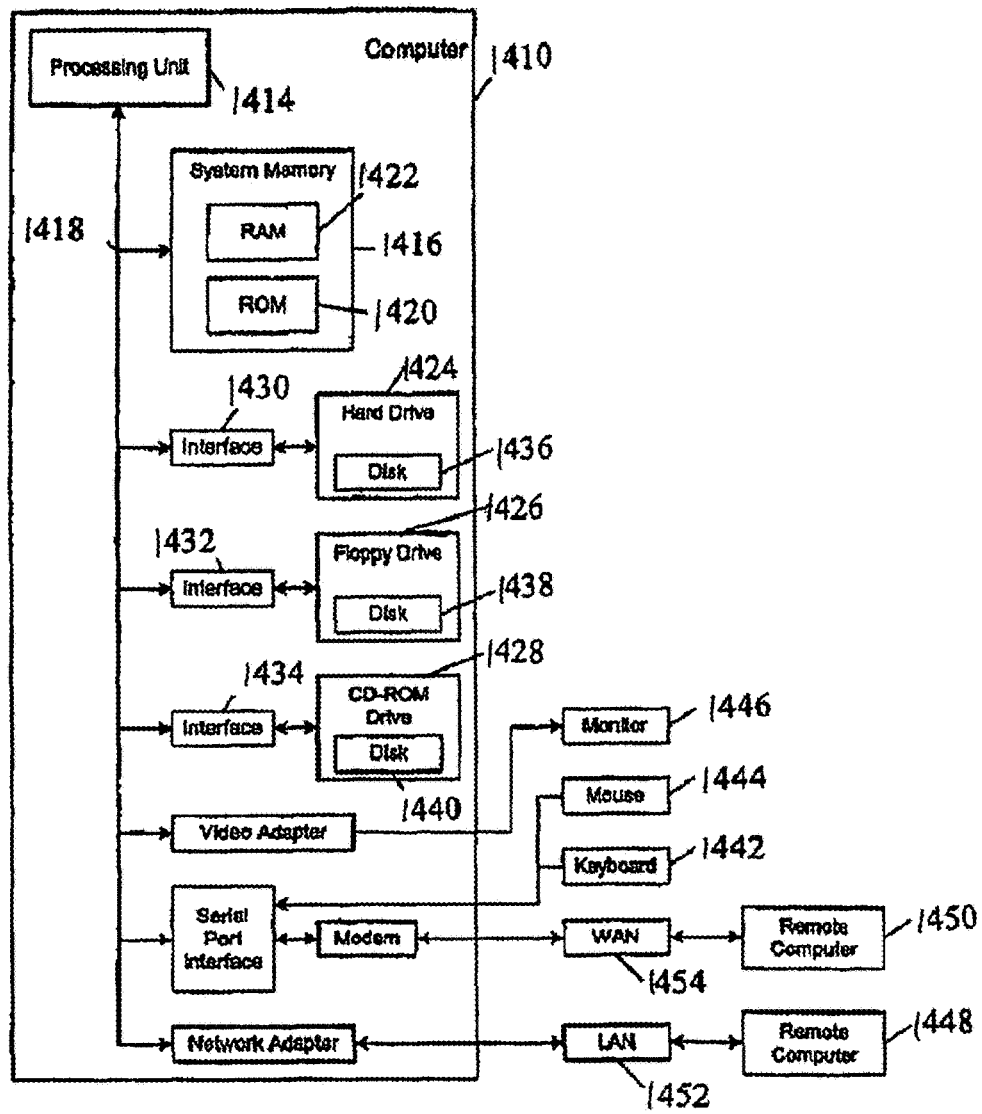
FIG. 15 depicts a computer in accordance with some embodiments.

In an exemplary embodiment, the presently described system 100 gives the user 245 the ability to:

to view a visual representation of visitors on an online store (website) or a brochure website in the form of avatars and a 3d graphical representation of the web site
to view visitors in a form of an avatars various positions on the screen, according to the visitor's location on the website.
to view statistical and factual information about each visitor by the way of the appearance of the avatar
to view statistical and factual Information about each visitor by clicking on the visitor's avatar
to view ranking calculation of how likely the visitor is to buy during the visit to the website or Ranking calculation of how likely the visitor is to complete an enquiry form during the visit in a brochure site to view total value of additional sales that can potentially be gained by converting customers to complete their transactions, which is done by using the service.

to engage in a conversation (chat or audio) in the form of an online chat with the visitor by clicking on the visitor's avatar to send across a coupon (offer) to the visitor by clicking on the visitor's avatar Referring to FIG. 15, in one embodiment, the system 100 may be implemented as one or more respective software modules operating on a computer 1410. Computer 1410 includes a processing unit 1414, a system memory 1416, and a system bus 1418 that couples processing unit 1414 to the various components of computer 1410. Processing unit 1414 may include one or more processors, each of which may be in the form of any one of various commercially available processors. System memory 1416 includes a read only memory (ROM) 1420 that stores a basic input/output system (BIOS) containing start-up routines for computer 1410, and a random access memory (RAM) 1422. System bus 1418 may be a memory bus, a peripheral bus or a local bus, and may be compatible with any of a variety of bus protocols, including PCI, VESA, Microchannel, ISA, and EISA. Computer 1410 also includes a hard drive 1424, a floppy drive 1426, and CD ROM drive 1428 that are connected to system bus 1418 by respective interfaces 1430, 1432, 1434. Hard drive 1424, floppy drive 1426, and CD ROM drive 1428 contain respective computer-readable media disks 1436, 1438, 1440 that provide non-volatile or persistent storage for data, data structures and computer-executable instructions. Other computer-readable storage devices (e.g., magnetic tape drives, flash memory devices, and digital video disks) also may be used with computer 1410. A user may interact (e.g., enter commands or data) with computer 1410 using a keyboard 1442 and a mouse 1444. Other input devices (e.g., a microphone, joystick, or touch pad) also may be provided. Information may be displayed to the user on a monitor 1446. Computer 1410 also may include peripheral output devices, such as speakers and a printer. One or more remote computers 1448 may be connected to computer 1410 over a local area network (LAN) 1452, and one or more remote computers 1450 may be connected to computer 1410 over a wide area network (WAN) 1454 (e.g., the Internet).

In one embodiment, the processing unit 1414 is a means for performing steps shown in FIGS. 1 and 3. In another embodiment, the tracking system 210 is implemented using computer 1410. In another embodiment, the console system 215 is implemented using computer 1410. In another embodiment, the tracking system 210 and the console system 215 are implemented using computer 1410.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A system comprising:

a visitor console, having at least one processor, displaying to a visitor a page view of a webpage from at least one website;

a user console having at least one processor, remote from the visitor console, displaying to a user a three dimensional (3D) graphical representation of the at least one website;

at least one server providing a tracking program code to the visitor console, wherein the visitor console uses the tracking program to generate a visitor identity key for the visitor, wherein the visitor console uses the tracking program to generate action data by tracking the visitor's real-time interactions with the at least one website, wherein the visitor identity key and the action data are transmitted to the at least one server;

the user console displaying at least one computer generated character representing the visitor based on the visitor identity key in the 3D graphical representation of the at least one website;

the user console updating the at least one computer generated character in the 3D graphical representation of the at least one website based on a change in the action data;

wherein the user console displays statistics of the visitor when the user's pointing device is hovering over the at least one computer generated character, wherein the user console displays additional statistics of the visitor or displays a pop-up window to allow the user to communicate with the visitor when the user clicks the at least one computer generated character, wherein the statistics of the visitor are based on the action data, visitor console information, or visitor's past purchases.

2. The system of claim 1, wherein the three dimensional graphical representation of the at least one website comprises at least one object that corresponds to the webpage of the at least one website.

3. The system of claim 2, wherein the at least one object is a search desk that corresponds to a search results webpage of the at least one website.

4. The system of claim 3, wherein the at least one computer generated character represents the visitor using the visitor console to view the search results webpage.

5. The system of claim 4, wherein the at least one computer generated character is displayed adjacent to the search desk.

6. The system of claim 2, wherein the at least one object is an information desk that corresponds to an information based webpage of the at least one website.

7. The system of claim 6, wherein the at least one computer generated character represents the visitor using the visitor console to view the information based webpage.

8. The system of claim 7, wherein the at least one computer generated character is displayed adjacent to the information desk.

9. The system of claim 1, wherein the three dimensional graphical representation of the at least one website comprises a first object that corresponds to a first product displayed on the webpage.

10. The system of claim 9, wherein the at least one computer generated character represents the visitor using the visitor console to view the first product on the webpage.

11. The system of claim 10, wherein the at least one computer generated character is displayed adjacent to the first object.

12. The system of claim 11, wherein the three dimensional graphical representation of the at least one website comprises a second object that corresponds to a second product displayed on the webpage.

13. The system of claim 12, wherein the at least one computer generated character is displayed adjacent to the second object when the visitor views the second product on the webpage.

14. The system of claim 12, wherein the at least one computer generated character is repositioned adjacent to the second object when the visitor views the second product on the webpage.

15. The system of claim 12, wherein the at least one computer generated character is repositioned in an animated way.

* * * * *